United States Patent
Maeda et al.

(10) Patent No.: US 10,885,356 B2
(45) Date of Patent: Jan. 5, 2021

(54) PARKING ASSISTING APPARATUS AND CONTROL UNIT

(71) Applicant: DENSO CORPORATION, Kariya (JP)

(72) Inventors: Yu Maeda, Nisshin (JP); Mitsuyasu Matsuura, Nisshin (JP); Hirohiko Yanagawa, Kariya (JP); Hideki Otsuka, Kariya (JP)

(73) Assignee: DENSO CORPORATION, Aichi-pref (JP)

( * ) Notice: Subject to any disclaimer, the term of this patent is extended or adjusted under 35 U.S.C. 154(b) by 17 days.

(21) Appl. No.: 16/442,799

(22) Filed: Jun. 17, 2019

(65) Prior Publication Data

US 2019/0303691 A1    Oct. 3, 2019

Related U.S. Application Data

(63) Continuation of application No. PCT/JP2017/040494, filed on Nov. 9, 2017.

(30) Foreign Application Priority Data

Dec. 19, 2016    (JP) ................. 2016-245728

(51) Int. Cl.
   *G06K 9/00* (2006.01)
   *H04N 5/247* (2006.01)
   *B60R 21/00* (2006.01)

(52) U.S. Cl.
   CPC ........ *G06K 9/00805* (2013.01); *B60R 21/00* (2013.01); *G06K 9/00812* (2013.01); *H04N 5/247* (2013.01)

(58) Field of Classification Search
   CPC .......... G06K 9/00805; G06K 9/00812; G06K 9/629; G06K 9/3241; G06K 9/325; B60R 21/00; H04N 5/247

(Continued)

(56) References Cited

U.S. PATENT DOCUMENTS

| 2008/0010018 A1* | 1/2008 | Satonaka ........... B62D 15/0285 |
| | | 701/300 |
| 2010/0066515 A1 | 3/2010 | Shimazaki et al. |
| 2016/0307052 A1* | 10/2016 | Han ................... G06K 9/00798 |

FOREIGN PATENT DOCUMENTS

| JP | 63-191987 A | 8/1988 |
| JP | 2006-193014 A | 7/2006 |

(Continued)

*Primary Examiner* — Amandeep Saini
(74) *Attorney, Agent, or Firm* — Maschoff Brennan

(57) ABSTRACT

A parking assisting apparatus includes an imaging unit acquiring image information corresponding to an image of surroundings of a vehicle, an image processing section recognizing a feature shape in the image by processing the image information, an obstacle detecting section acquiring positional-relationship information corresponding to a positional relationship between the vehicle and an obstacle present around a parking space, and a manner-of-parking selecting section selecting a manner of parking the vehicle in the parking space from manner candidates including perpendicular parking and parallel parking based on the feature shape and the positional-relationship information. The manner-of-parking selecting section selects the manner of parking from the manner candidates by integrating a likelihood of each of the manner candidates based on the positional-relationship information with a likelihood of the manner candidate based on a recognition result to calculate final likelihoods of the respective manner candidates, and by comparing the calculated final likelihoods.

4 Claims, 8 Drawing Sheets

(58) Field of Classification Search
USPC .......................................................... 382/104
See application file for complete search history.

(56) References Cited

FOREIGN PATENT DOCUMENTS

| JP | 2007-290433 A | 11/2007 |
| JP | 2007-320433 A | 12/2007 |
| JP | 2010-202018 A | 9/2010 |
| JP | 2012-001081 A | 1/2012 |
| JP | 2014-031104 A | 2/2014 |
| JP | 2016-101778 A | 6/2016 |

* cited by examiner

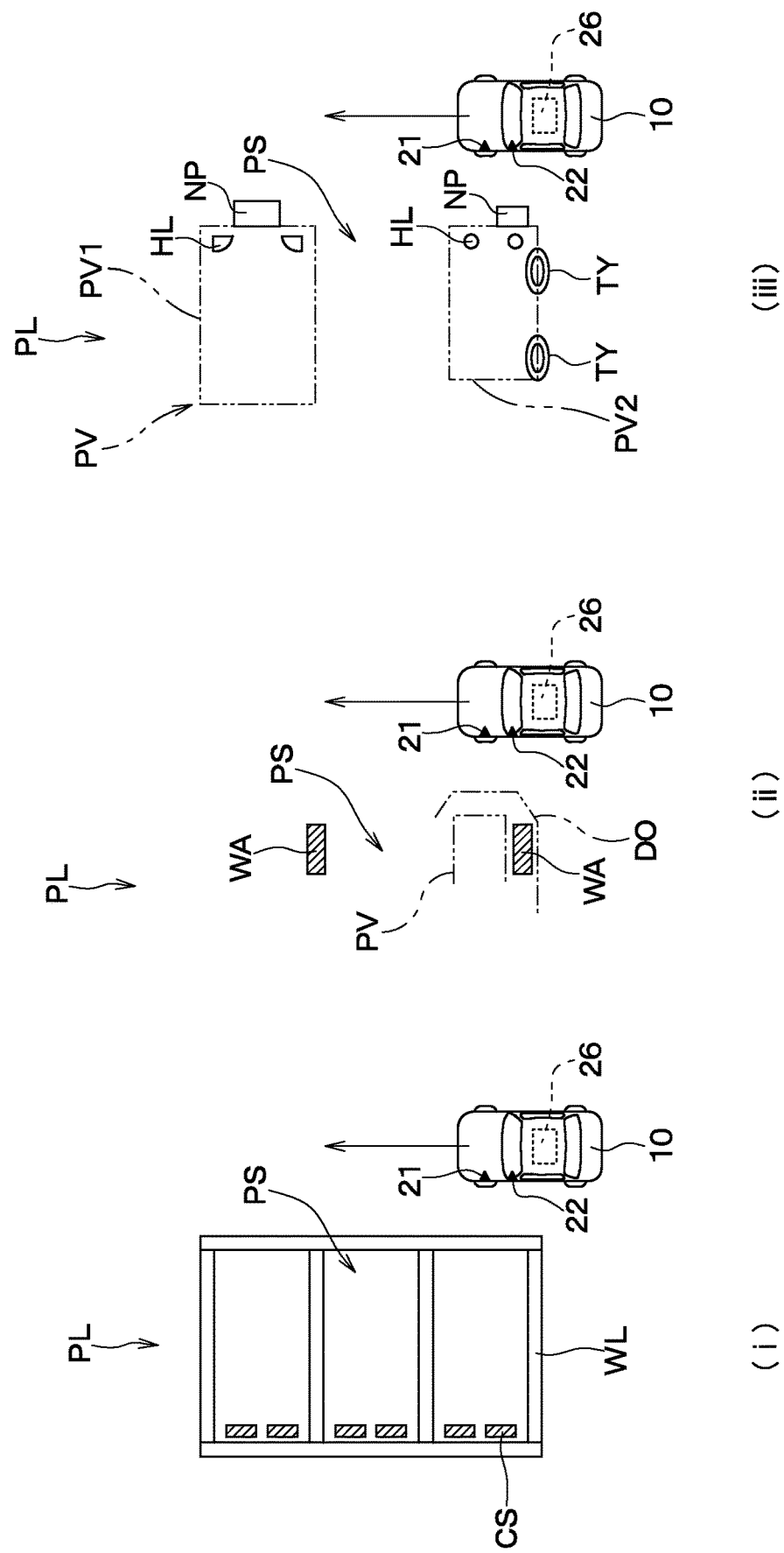

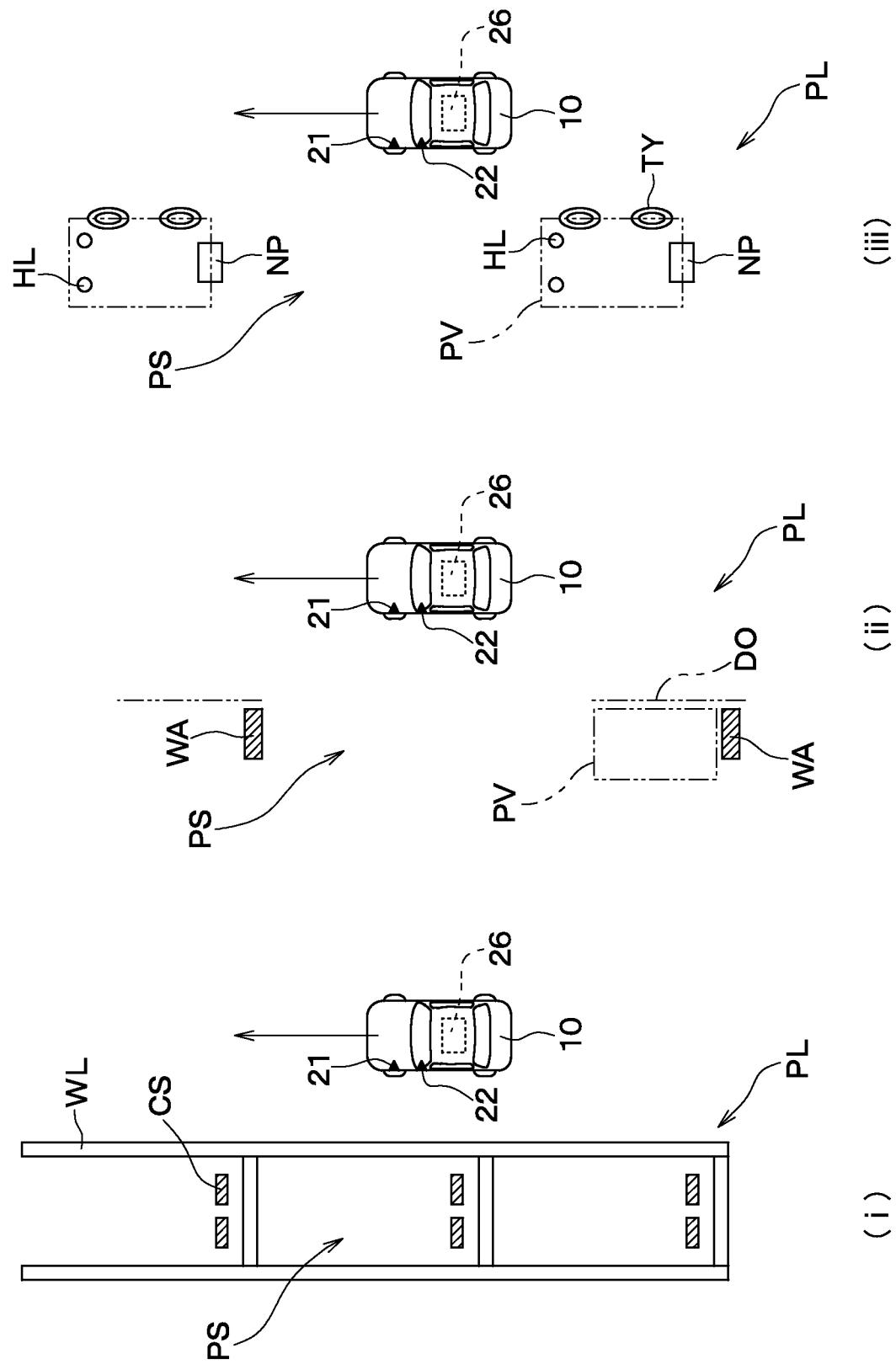

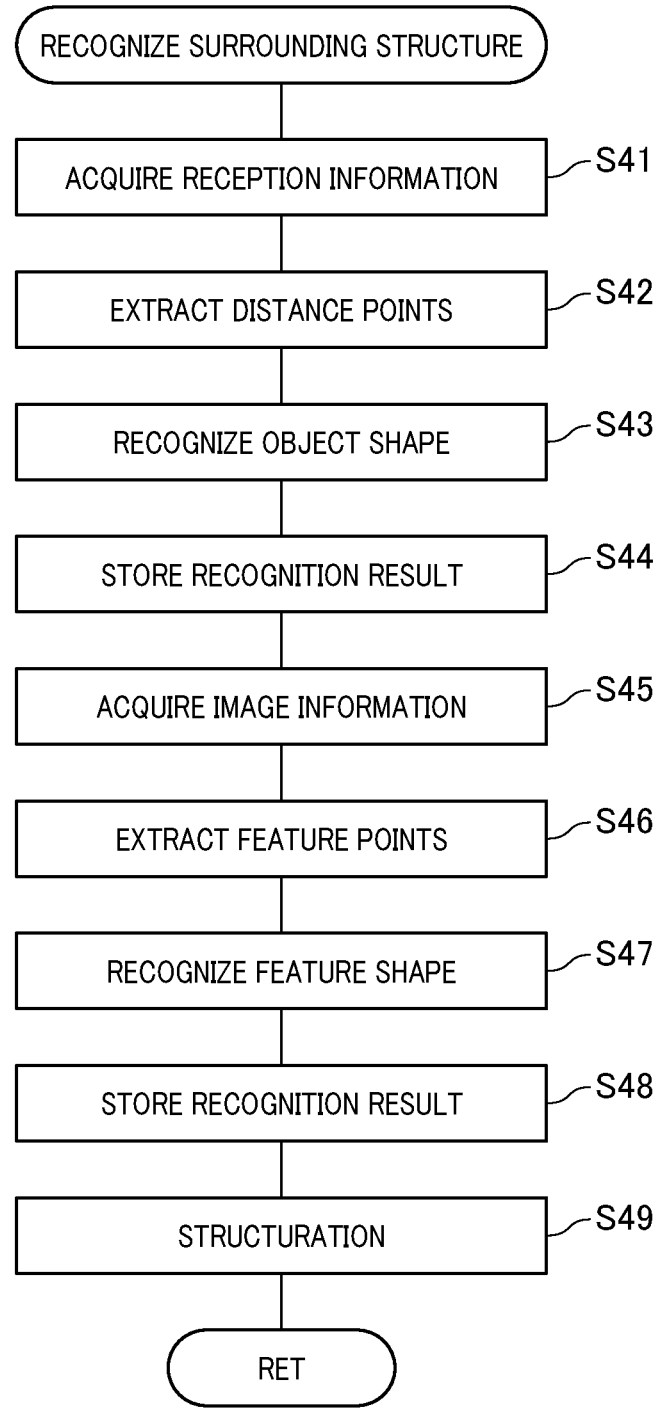

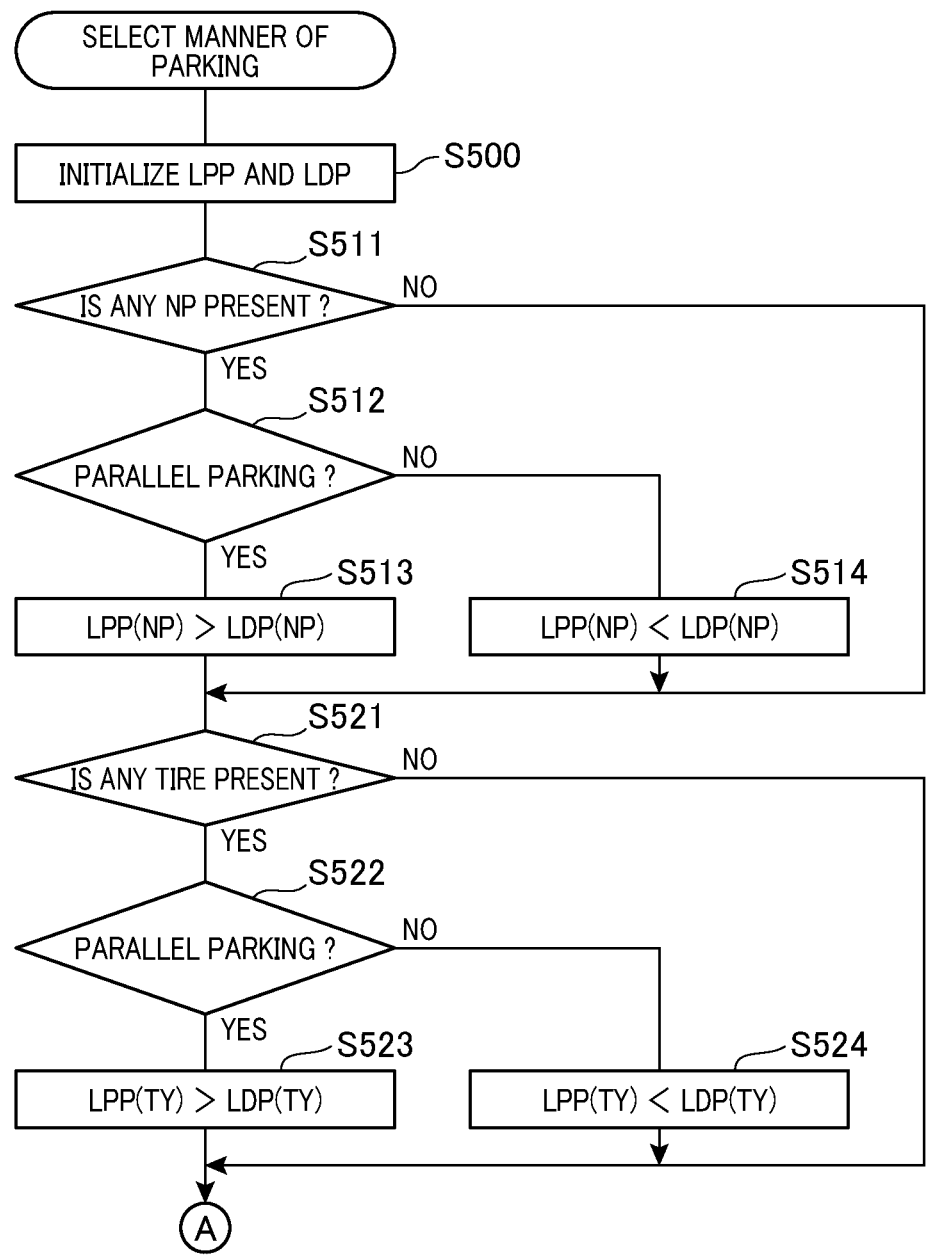

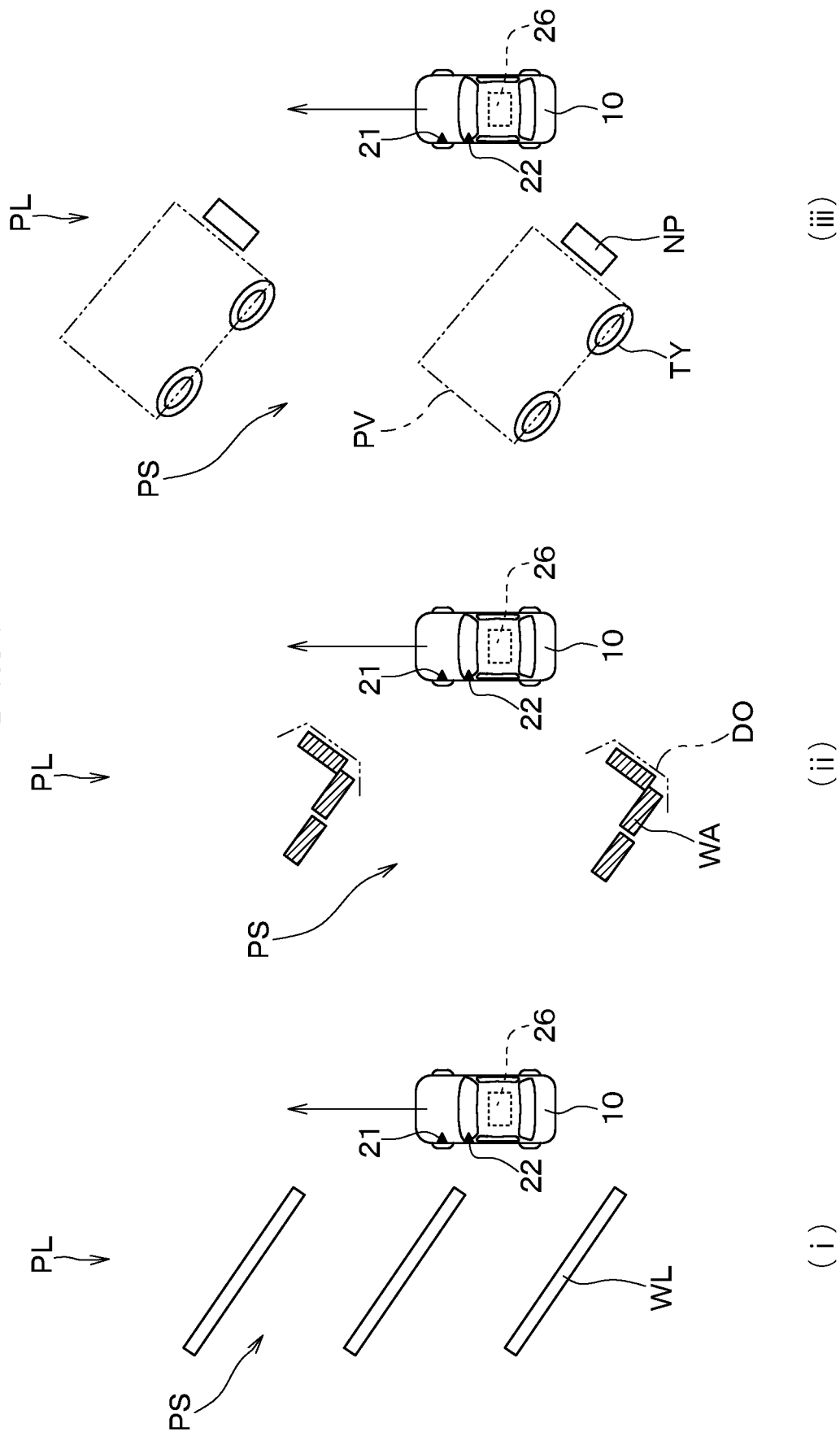

ical Field

The present disclosure relates to a parking assisting apparatus and a control unit.

Related Art

An apparatus captures an image of surroundings of a vehicle by using a camera attached to the vehicle, detects white lines based on the captured image, and calculates the size of a parking space based on the detected white lines to determine whether perpendicular parking or parallel parking is enabled in the parking space.

SUMMARY

As an aspect of the disclosure, a parking assisting apparatus configured to be mounted in a vehicle to assist in parking the vehicle in a parking space is provided. The parking assisting apparatus includes: an imaging unit provided to acquire image information corresponding to an image of surroundings of the vehicle; an image processing section provided to recognize a feature shape in the image by processing the image information acquired by the imaging unit; an obstacle detecting section provided to acquire positional-relationship information corresponding to a positional relationship between the vehicle and an obstacle present around the parking space, and a manner-of-parking selecting section provided to select a manner of parking the vehicle in the parking space from a plurality of manner candidates including perpendicular parking and parallel parking based on the feature shape recognized by the image processing section and the positional-relationship information acquired by the obstacle detecting section. The manner-of-parking selecting section is configured to select the manner of parking from the plurality of manner candidates by integrating a likelihood of each of the manner candidates based on the positional-relationship information acquired by the obstacle detecting section with a likelihood of the manner candidate based on a recognition result for at least one of a white line, a tire of a parked vehicle, and a number plate of the parked vehicle, each of which is the feature shape, to calculate final likelihoods of the respective manner candidates, and by comparing the calculated final likelihoods of the respective manner candidates with each other.

BRIEF DESCRIPTION OF THE DRAWINGS

In the accompanying drawings:

FIG. 2 is a schematic diagram illustrating an example of a situation where perpendicular parking is selected;

FIG. 3 is a schematic diagram illustrating an example of a situation where parallel parking is selected;

FIG. 4 is a flowchart illustrating an example of operations of the parking assisting apparatus illustrated in FIG. 1;

FIG. 5A is a flowchart illustrating an example of operations of the parking assisting apparatus illustrated in FIG. 1;

FIG. 6 is a schematic diagram illustrating an example of a situation where angle parking is selected.

DETAILED DESCRIPTION OF THE PREFERRED EMBODIMENTS

The apparatus described in JP-A-2012-1081 captures an image of surroundings of a vehicle by using a camera attached to the vehicle, detects white lines based on the captured image, and calculates the size of a parking space based on the detected white lines to determine whether perpendicular parking or parallel parking is enabled in the parking space.

Partition lines such as white lines which define parking spaces may fail to be appropriately detected. This occurs, for example, in a case where the white lines have been faded by friction or the like, in a case where new white lines are formed on faded, old white lines and a manner of parking differs between the new white lines and the old white lines, in a case where ropes are laid on the ground instead of white lines, and in a case where no white lines or the like are marked. In other cases, a manner of parking different from a manner of parking based on previously clearly marked partition lines may be temporarily set. In these cases, the apparatus described in JP-A-2012-1081 fails to appropriately determine the manner of parking.

Embodiments will be described below with reference to the drawings. Various changes applicable to the embodiments will be collectively described as modified examples after description of a series of embodiments.

(Configuration)

Figure 1:
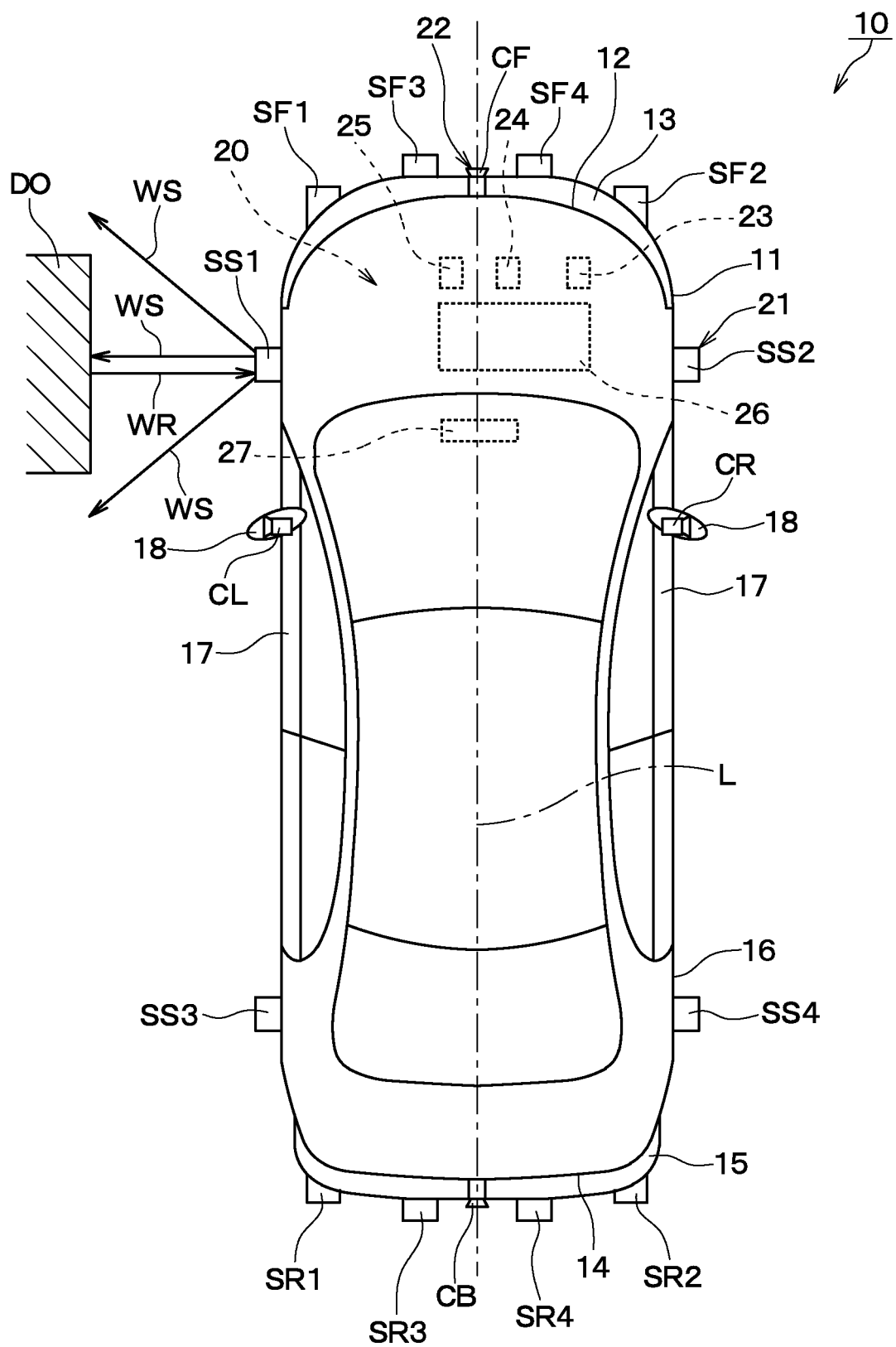
FIG. 1 is a schematic diagram of a configuration of a vehicle equipped with a parking assisting apparatus according to an embodiment.

With reference to FIG. 1, a vehicle 10 which is a four-wheeled vehicle and includes a vehicle body 11 shaped substantially like a rectangle is shown in plan view. A direction that is orthogonal to a vehicle centerline L and that defines a vehicle width of the vehicle 10 is referred to as the "vehicle width direction". The vehicle width direction corresponds to a lateral direction in FIG. 1. Furthermore, a direction parallel to the vehicle centerline L (that is, an upward direction in FIG. 1) is referred to as the "forward direction", and the other direction parallel to vehicle centerline L (that is, a downward direction in FIG. 1) is referred to as the "rearward direction". A forward side of the vehicle 10 and the vehicle body 11 is referred to as the "front side", and the opposite side is referred to as the "rear side". Furthermore, a right side, in FIG. 1, of the vehicle 10 and the vehicle body 11 is simply referred to as the "right side", and a left side, in FIG. 1, of the vehicle 10 and the vehicle body 11 is simply referred to as the "left side".

A front bumper 13 is attached to a front surface portion 12 corresponding to a front end portion of the vehicle body 11. A rear bumper 15 is attached to a rear surface portion 14 corresponding to a rear end portion of the vehicle body 11. Door panels 17 are provided to side surface portions 16 of the vehicle body 11. In a specific example illustrated in FIG. 1, two door panels 17 are provided on each of the right and left sides, and a total of four door panels 17 are provided. Door mirrors 18 are mounted to the respective front door panels 17.

A parking assisting apparatus 20 is mounted in the vehicle 10. The parking assisting apparatus 20 is configured to assist in parking the vehicle 10 in a parking space PS. For the parking space PS, see FIG. 2 and the like. Specifically, the parking assisting apparatus 20 includes a ranging sensor 21, an imaging unit 22, a vehicle speed sensor 23, a shift position sensor 24, a steering angle sensor 25, a control unit 26, and a display 27. The units forming the parking assisting apparatus 20 will be described below in detail. For simplification of illustration, an electric connection relationship among the units forming the parking assisting apparatus 20 is omitted from FIG. 1.

The ranging sensor 21 is provided to transmit a search wave WS externally from the vehicle 10 and to receive a received wave WR including a reflected wave of the search wave WS from a detected obstacle DO and having intensity corresponding to a distance between the vehicle 10 and the detected obstacle DO. Specifically, in the present embodiment, the ranging sensor 21 is what is called an ultrasonic sensor and is configured to be capable of transmitting the search wave WS, which is an ultrasonic wave, and receiving the received wave WR, which includes the ultrasonic wave. The ranging sensor 21 is electrically connected to the control unit 26. That is, under the control of the control unit 26, the ranging sensor 21 transmits the search wave WS, and generates a signal (hereinafter referred to as "reception information") corresponding to a reception result for the received wave WR and transmits the signal to the control unit 26.

In the present embodiment, a plurality of ranging sensors 21 are mounted to the vehicle body 11. That is, the front bumper 13 is provided with, as the ranging sensors 21, a first front sonar SF1, a second front sonar SF2, a third front sonar SF3, and a fourth front sonar SF4. Similarly, the rear bumper 15 is provided with, as the ranging sensors 21, a first rear sonar SR1, a second rear sonar SR2, a third rear sonar SR3, and a fourth rear sonar SR4. Furthermore, the side surface portions 16 of the vehicle body 11 are provided with, as the ranging sensors 21, a first side sonar SS1, a second side sonar SS2, a third side sonar SS3, and a fourth side sonar SS4.

The first front sonar SF1 is disposed at a left front corner of the vehicle body 11. The second front sonar SF2 is disposed at a right front corner of the vehicle body 11. The first front sonar SF1 and the second front sonar SF2 are provided symmetrically with respect to a vehicle centerline L. The third front sonar SF3 is disposed between the first front sonar SF1 and the vehicle centerline L. The fourth front sonar SF4 is disposed between the second front sonar SF2 and the vehicle centerline L. The third front sonar SF3 and the fourth front sonar SF4 are provided symmetrically with respect to the vehicle centerline L.

The first rear sonar SR1 is disposed at a left rear corner of the vehicle body 11. The second rear sonar SR2 is disposed at a right rear corner of the vehicle body 11. The first rear sonar SR1 and the second rear sonar SR2 are provided symmetrically with respect to the vehicle centerline L. The third rear sonar SR3 is disposed between the first rear sonar SR1 and the vehicle centerline L. The fourth rear sonar SR4 is disposed between the second rear sonar SR2 and the vehicle centerline L. The third rear sonar SR3 and the fourth rear sonar SR4 are provided symmetrically with respect to the vehicle centerline L.

The first side sonar SS1 is disposed between the left door mirror 18 and the first front sonar SF1 in the longitudinal direction of the vehicle 10. The second side sonar SS2 is disposed between the right door mirror 18 and the second front sonar SF2 in the longitudinal direction of the vehicle 10. The first side sonar SS1 and the second side sonar SS2 are provided symmetrically with respect to the vehicle centerline L. The third side sonar SS3 is disposed between the left front door panel 17 and the first rear sonar SR1 in the longitudinal direction of the vehicle 10. The fourth side sonar SS4 is disposed between the right front door panel 17 and the second rear sonar SR2 in the longitudinal direction of the vehicle 10. The third side sonar SS3 and the fourth side sonar SS4 are provided symmetrically with respect to the vehicle centerline L.

In the present embodiment, the imaging unit 22 is a camera including an image sensor such as a charge-coupled device and provided to acquire image information corresponding to an image of surroundings of the vehicle 10. The charge-coupled device is also referred to as the CCD. The imaging unit 22 is electrically connected to the control unit 26. That is, under the control of the control unit 26, the imaging unit 22 acquires image information and transmits the image information acquired to the control unit 26.

In the present embodiment, the vehicle 10 is equipped with a plurality of imaging units 22, that is, a front camera CF, a rear camera CB, a left camera CL, and a right camera CR. The front camera CF is mounted on the front surface portion 12 of the vehicle body 11 to acquire image information corresponding to a forward image from the vehicle 10. The rear camera CB is mounted on the rear surface portion 14 of the vehicle body 11 to acquire image information corresponding to a rearward image from the vehicle 10. The left camera CL is mounted on the left door mirror 18 to acquire image information corresponding to a leftward image from the vehicle 10. The right camera CR is mounted on the right door mirror 18 to acquire image information corresponding to a rightward image from the vehicle 10.

The vehicle speed sensor 23, the shift position sensor 24, and the steering angle sensor 25 are electrically connected to the control unit 26. The vehicle speed sensor 23 is provided to generate a signal corresponding to a traveling speed of the vehicle 10 and to transmit the signal to the control unit 26. The traveling speed of the vehicle 10 is hereinafter simply referred to as the "vehicle speed". The shift position sensor 24 is provided to generate a signal corresponding to a shift position and to transmit the signal to the control unit 26. The steering angle sensor 25 is provided to generate a signal corresponding to a steering angle and to transmit the signal to the control unit 26.

The control unit 26 is provided inside the vehicle body 11. The control unit 26 is what is called an in-vehicle microcomputer including a CPU, a ROM, a RAM, a nonvolatile RAM (for example, a flash ROM), and the like, which are not illustrated. The control unit 26 is configured to enable various control operations by allowing the CPU to read programs (that is, routines described below) from the ROM or the nonvolatile RAM and to execute the programs. That is, the control unit 26 is configured to perform a parking assisting operation based on signals and information received from the ranging sensor 21, the imaging unit 22, the vehicle speed sensor 23, the shift position sensor 24, and the steering angle sensor 25. Furthermore, the ROM or the nonvolatile RAM previously stores various data (for example, initial values, a lookup table, and a map) used to execute the programs.

FIG. 2 illustrates examples of a situation where the vehicle 10 is perpendicular-parked in the parking space PS, specifically, what is called "parking in a garage" is performed. "Parking in a garage" refers to a manner of perpendicular parking in which an arrangement direction of a plurality of parallel parking spaces PS or a plurality of parallel parked vehicles PV is substantially orthogonal to a longitudinal direction (that is, a longitudinal direction) of each parking space PS or each parked vehicle PV. FIG. 3 illustrates an example of a situation where the vehicle 10 is parallel-parked in the parking space PS. The control unit 26 will be described below in detail with reference to FIGS. 1 to 3. In FIG. 2 and FIG. 3, illustration of the ranging sensors 21 and the imaging units 22 is simplified for convenience of illustration.

The control unit 26, serving as an image processing section, processes the image information acquired by the imaging units 22 to recognize feature points and feature shapes in an image. In the present embodiment, the control unit 26 is configured to be capable of recognizing three-dimensional shapes of objects in the image by SFM processing. SFM is an abbreviation of Structure from Motion.

The control unit 26, serving as an obstacle detecting section, acquires positional-relationship information corresponding to the positional relationship between the vehicle 10 and an obstacle or the like present around the parking space PS based on reception information from the ranging sensor 21. In the present embodiment, a plurality of ranging sensors 21 are provided. Accordingly, the control unit 26 is configured to be capable of acquiring, as positional-relationship information about an object and the vehicle 10, information corresponding to a distance between the object and the vehicle 10 and an azimuth of the object from the vehicle 10 based on reception information from a plurality of ranging sensors 21, for example, from the first front sonar SF1 and the second front sonar SF2 in a case of an obstacle located leftward and forward of the vehicle 10. In other words, the control unit 26 is configured to be capable of acquiring a relative position between the object and the vehicle 10.

The control unit 26, serving as a manner-of-parking selecting section, selects a manner of parking of the vehicle 10 in the parking space PS from a plurality of manner candidates including perpendicular parking and parallel parking based on the positional-relationship information acquired using the ranging sensors 21 and the feature shapes recognized using the imaging units 22. Specifically, the control unit 26 is configured to select the manner of parking from a plurality of manner candidates by integrating the likelihood of each of the manner candidates based on the acquired positional-relationship information about a detected obstacle DO including a wall-shaped three-dimensional object WA and about a car stop CS with the likelihood of the manner candidate based on a recognition result for at least one of the feature shapes: a white line WL, a head light HL of the parked vehicle PV, a number plate NP of the parked vehicle PV, and a tire TY of the parked vehicle PV.

The display 27 is disposed in the interior of the vehicle 10. The display 27 is electrically connected to the control unit 26 to provide display in conjunction with a parking assisting operation under the control of the control unit 26.

(Brief Description of Operations)

Operations of the parking assisting apparatus 20 will be described below in brief with reference to FIG. 2 and FIG. 3. In FIG. 2 and FIG. 3, (i) illustrates a case where white lines WL and car stops CS are provided in a parking lot PL. Furthermore, (ii) illustrates a case where a detected obstacle DO including a wall-shaped three-dimensional object WA is present around a parking space PS in the parking lot PL. Moreover, (iii) illustrates a case where feature shapes, such as number plates NP, of a parked vehicle PV around the parking space PS can be recognized.

As illustrated in (i) in FIG. 2 and FIG. 3, the white lines WL separating a plurality of adjacent parking spaces PS from one another may be provided in the parking lot PL. In this case, the control unit 26 can select the manner of parking of the vehicle 10 by processing the image information acquired by the imaging units 22 to recognize the white lines WL.

Furthermore, instead of the white lines WL or along with the white lines WL, the car stops CS may be provided. In this case, the control unit 26 can select the manner of parking of the vehicle 10 based on positional-relationship information about the car stops CS acquired using the ranging sensors 21. Specifically, in a case where positions of the plurality of car stops CS or external forms of the car stops CS defining a longitudinal direction are aligned substantially in line along the traveling direction of the vehicle 10, a selection result for the manner of parking of the vehicle 10 may be parking in a garage. See (i) in FIG. 2. In contrast, in a case where the external forms of the car stops CS defining the longitudinal direction are substantially orthogonal to the traveling direction of the vehicle 10, the selection result for the manner of parking of the vehicle 10 may be parallel parking. See (i) in FIG. 3.

As illustrated in (ii) in FIG. 2 and FIG. 3, the wall-shaped three-dimensional object WA may be present between a plurality of adjacent parking spaces PS. The wall-shaped three-dimensional object WA is, for example, a wall or a pole in an indoor parking lot. Furthermore, an empty parking space PS where the vehicle 10 can be parked may be present next to an occupied parking space PS. In this case, the control unit 26 can select the manner of parking of the vehicle 10 based on the positional-relationship information about the detected obstacle DO acquired using the ranging sensors 21. In this case, the positional-relationship information about the detected obstacle DO may include positional-relationship information about the wall-shaped three-dimensional object WA and/or the parked vehicle PV adjacent to the wall-shaped three-dimensional object WA. Specifically, the manner of parking of the vehicle 10 can be selected based on, for example, a positional relationship between a plurality of detected obstacles DO.

As illustrated in (iii) in FIG. 2 and FIG. 3, an empty parking space PS where the vehicle 10 can be parked may be present next to the occupied parking space PS. In this case, a feature shape, such as the number plate NP, of the parked vehicle PV in the occupied parking space PS may be recognized. The control unit 26 can process the image information acquired by the imaging units 22 to recognize the feature shape of the parked vehicle PV, thus selecting the manner of parking of the vehicle 10.

Specifically, for example, in a case where an angle between a longitudinal direction of the number plate NP and the traveling direction of the vehicle 10 is small (for example, 0 to 15 degrees), the selection result for the manner of parking of the vehicle 10 may be parking in a garage. See (iii) in FIG. 2. In contrast, in a case where the angle between the longitudinal direction of the number plate NP and the traveling direction of the vehicle 10 is large (for example, 75 to 90 degrees), the selection result for the manner of parking of the vehicle 10 may be parallel parking. See (iii) in FIG. 3.

Furthermore, in a case where a plurality of the tires TY are aligned substantially in line along the traveling direction of the vehicle 10, the selection result for the manner of parking of the vehicle 10 may be parking in a garage. See (iii) in FIG. 2. In contrast, in a case where a pair of the tires TY is arranged substantially orthogonally to the traveling direction of the vehicle 10, the selection result for the manner of parking of the vehicle 10 may be parallel parking. See (iii) in FIG. 3.

Furthermore, in a case where a pair of head lights HL are aligned substantially in line along the traveling direction of the vehicle 10, the selection result for the manner of parking of the vehicle 10 may be parking in a garage. See (iii) in FIG. 2. In contrast, in a case where the pair of the head lights HL is arranged substantially orthogonally to the traveling direction of the vehicle 10 and ahead of the vehicle 10, or the head lights HL cannot be recognized at all ahead of the vehicle 10, the selection result for the manner of parking of the vehicle 10 may be parallel parking. See (iii) in FIG. 3.

In the present embodiment, as described above, the manner of parking of the vehicle 10 can be selected based on the recognition result for the white line WL, the car stop CS, the detected obstacle DO, the head light HL, the tire TY, and the number plate NP. However, not all the recognition results for these feature shapes correspond to the same manner of parking. That is, for example, some of the feature shapes may be difficult to recognize or the manner of parking based on the recognition result for some feature shapes may be inconsistent with the manner of parking based on the recognition result for other feature shapes.

Specifically, the white lines WL defining the parking spaces PS may be faded by friction or the like. Furthermore, new white lines WL for parking in a garage may be formed on old white lines WL for parallel parking. In other cases, even with clear white lines WL, in a case where the number of vehicles parked is expected to exceed a normal maximum capacity for any reason, for example, due to a special event to be held, a manner of parking different from the normal manner of parking based on the white lines WL may be set. In these cases, it is difficult to make an appropriate selection from the manner candidates by using the recognition result based on the white lines WL.

In many parking lots PL, instead of the white lines WL, ropes are laid on the ground. In such a parking lot PL, the ropes are difficult to recognize in an image, and in many cases, no car stops CS are provided. Furthermore, no white lines WL may be provided in the parking lot PL. Specifically, for example, in a case where a large outdoor event is to be held, an open space proximate to an event site, for example, a planned site for a factory or a shopping complex or a limited highway under construction may be used as a makeshift parking lot. In these cases, it is difficult to make an appropriate selection from the manner candidates by using the recognition result for the white lines WL and the car stops CS.

To inhibit the vehicle body 11 from being damaged during parking, elastic materials such as sponges may be attached to the wall-shaped three-dimensional object WA. Furthermore, the parked vehicle PV parked proximately to the wall-shaped three-dimensional object WA may be covered with an object with a low reflectance for the search wave (for example, snow or a cover). In these cases, the detected obstacle DO may fail to be appropriately detected by the ranging sensors 21.

The shape and the position of the number plate NP is substantially constant among the parked vehicles PV in compliance with laws and regulations regarding automobiles. In contrast, the positions of the tires TY may vary depending on the size of the parked vehicle PV, the position of the parked vehicle PV within the parking space PS, a steering state during parking, or the like. Furthermore, the head lights HL vary in shape and position according to the vehicle type, and may be retracted inside the vehicle body or shielded by a vehicle component or the like in parking conditions. Thus, among the various feature shapes of the parked vehicle PV, the number plate NP may be most reliable in selecting the manner of parking based on the recognition result.

For example, as seen in (iii) in FIG. 2, in an ordinary vehicle PV1, the number plate NP is provided at a central portion of the vehicle in the vehicle width direction. In contrast, in a light vehicle PV2, a front number plate NP is often provided slightly rightward from the central portion of the vehicle in the vehicle width direction or slightly leftward from the central portion in a case where the light vehicle PV2 is viewed from the front. Accordingly, in a case where the parked vehicle PV and the corresponding number plate NP are detected laterally from the vehicle 10 and the number plate NP is recognized to be present slightly leftward from the central portion of the parked vehicle PV in the vehicle width direction, the parked vehicle PV is likely to be the light vehicle PV2 parked in such a manner as to be backed into a garage, even with no recognition of the head light HL.

However, the front number plate NP of the parked vehicle PV may be located at a special position. Moreover, the various feature shapes of the parked vehicle PV may inherently be difficult to recognize depending on a lighting condition of the parking lot PL or the like. In these cases, it is difficult to make an appropriate selection from the manner candidates by using the recognition result for the various feature shapes of the parked vehicle PV.

In view of the circumstances described above, in the present embodiment, the control unit 26 integrates the likelihood of the manner of parking based on the recognition result for the car stops CS and the detected obstacle DO obtained using the ranging sensors 21, with the likelihood of the manner of parking based on the other recognition results obtained using the imaging unit 22. Furthermore, the control unit 26 selects the most probable manner of parking based on the integrated likelihood.

After selection of the manner of parking ends, the control unit 26 performs an operation of assisting in parking in a recognized target parking space PS, for example, a guiding operation using the display 27 or an automatic operation. At this time, the control unit 26 can perform an appropriate parking assisting operation based on the recognition result obtained using the ranging sensors 21 and the imaging units 22. Specifically, for example, the control unit 26 can cause the display 27 to display a warning indicating that the recognized target parking space PS is reserved for a light vehicle, based on the recognition result for the number plate NP. Alternatively, for example, the control unit 26 can estimate an area in the parking space PS into which the vehicle 10 can travel, based on the recognition result for the tires TY.

(Specific Examples of Operations)

Specific examples of operations of the configuration of the present embodiment will be described with reference to flowcharts. In the description below in the specification and in the illustrated flowcharts, "steps" are simply represented as "S". Furthermore, in the description below in the specification, the CPU of the control unit 26 is simply referred to as the "CPU". This also applies to the nonvolatile RAM and the like of the control unit 26.

In a case where predetermined conditions for starting are satisfied, a surrounding structure recognition routine illustrated in FIG. 4 is activated. The activation conditions for the surrounding structure recognition routine include a lapse of a predetermined time since turn-on of a system activation switch for the vehicle 10, arrival of a predetermined activation timing for the present routine, and the like. In the surrounding structure recognition routine illustrated in FIG. 4, the CPU sequentially executes processes in S41 to S49 and temporarily ends the present routine.

In S41, the CPU acquires reception information from the ranging sensors 21. Based on the reception information, in S42, the CPU extracts distance points. The distance points are points in predetermined spatial coordinates corresponding to the current reception information. Each of the distance points has corresponding positional-relationship information. As described above, in the present embodiment, the positional-relationship information is acquired based on the reception information from the plurality of ranging sensors 21. Accordingly, in the present specific example, the distance points can be points in a three-dimensional map corresponding to a space around the vehicle 10. Subsequently, in S43, the CPU recognizes the external form of an object present around the vehicle 10 by connecting the distance points together. Moreover, the CPU stores, in the nonvolatile RAM, the recognition result obtained in S43. See S44.

In S45, the CPU acquires image information from the imaging units 22. Based on the image information, in S46, the CPU extracts feature points. As described above, in the present embodiment, a plurality of the imaging units 22 are provided. Furthermore, the control unit 26 can recognize the three-dimensional shape of each of the objects in an image by SFM processing. Accordingly, the feature points may be points in the three-dimensional map described above. Based on the feature points extracted as described above, the CPU recognizes feature shapes in S47. Subsequently, the CPU stores, in the nonvolatile RAM, the recognition result obtained in S47. See S48.

As described above, in S41 to S44, the CPU performs object recognition and feature shape recognition using the ranging sensors 21. Then, in S45 to S48, the CPU performs object recognition and feature shape recognition using the imaging units 22. Subsequently, in S49, the CPU integrates the recognition result obtained using the ranging sensors 21 with the recognition result obtained using the imaging units 22 to three-dimensionally recognize the objects and feature shapes in the space around the vehicle 10. This three-dimensional recognition is referred to as "structuration". A structured recognition result for the objects and feature shapes is stored in the nonvolatile RAM. The integration of a plurality of types of recognition results described above may be referred to as "fusion".

The CPU activates the surrounding structure recognition routine at predetermined time intervals during traveling of the vehicle 10. Thus, the structured three-dimensional information about the feature shapes is stored in the nonvolatile RAM in chronological order.

Figure 5B:
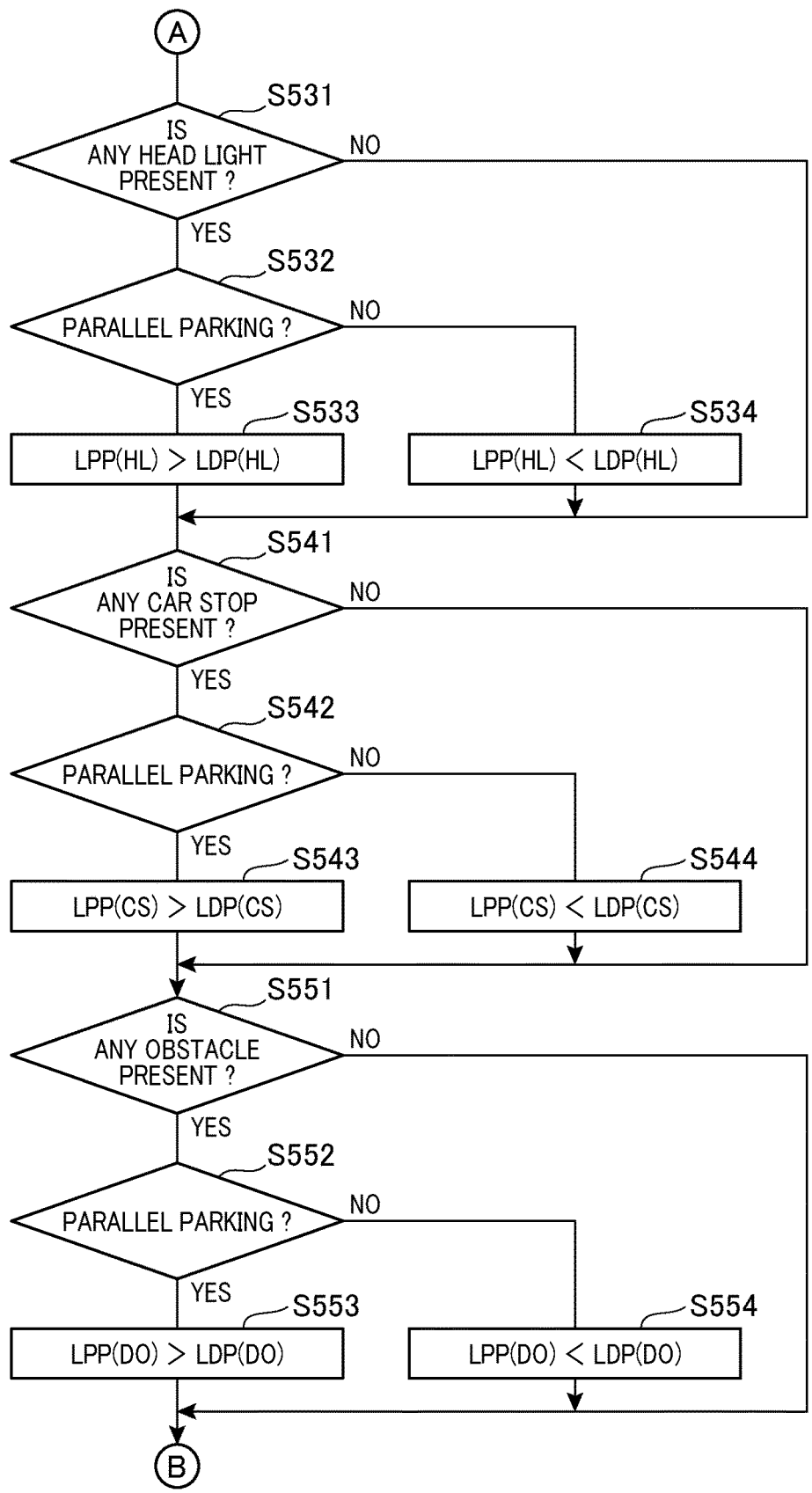
FIG. 5B is a flowchart illustrating an example of operations of the parking assisting apparatus illustrated in FIG. 1.
Figure 5C:
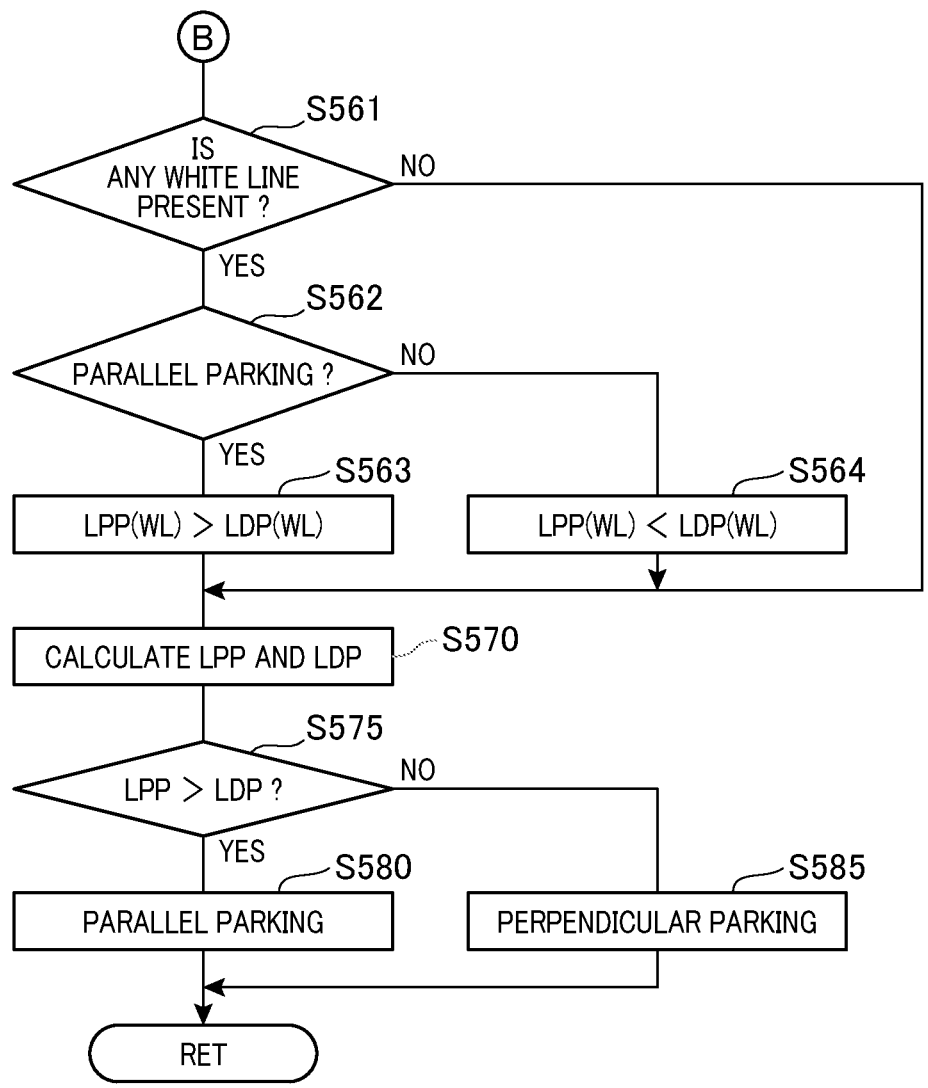
FIG. 5C is a flowchart illustrating an example of operations of the parking assisting apparatus illustrated in FIG. 1.

If the predetermined activation conditions are satisfied, the CPU activates a manner-of-parking selection routine illustrated in FIGS. 5A to 5C. Activation conditions for the manner-of-parking selection routine include, for example, the amount of recognition results stored in the nonvolatile RAM being equal to or larger than a predetermined value and the vehicle speed being lower than a predetermined value.

When the manner-of-parking selection routine is activated, in S500, the CPU initializes a likelihood of parallel parking LPP and a likelihood of perpendicular parking LDP. Specifically, in S500, the CPU respectively sets the likelihood of parallel parking LPP and the likelihood of perpendicular parking LDP to initial values LPP0 and LDP0. In the present specific example, the initial values LPP0 and LDP0 are both 0.5.

Then, in S511, the CPU determines whether any number plate NP has been recognized, that is, whether a recognition result for any number plate NP has been stored in the nonvolatile RAM. If any number plate NP has been recognized (that is, S511=YES), the CPU advances the present process to S512 and executes a process in S513 or S514 in accordance with a determination result in S512. In contrast, if no number plate NP has been recognized (that is, S511=NO), the CPU skips the processes in S512 to S514.

In S512, the CPU determines whether, in a case where the manner of parking is selected based on the current recognition result for the number plate NP, the selection result is parallel parking. If the selection result is parallel parking (that is, S512=YES), the CPU advances the present process to S513. In contrast, if the selection result is perpendicular parking (that is, S512=NO), the CPU advances the present process to S514.

In S513 and S514, the CPU sets, based on the lookup table or the map, the likelihood of parallel parking LPP (NP) and the likelihood of perpendicular parking LDP (NP) based on the recognition result for the number plate NP. The lookup table or map used in S513 and S514 defines a correspondence relationship between at least one of the parameters corresponding to the recognition result for the number plate NP and a value corresponding to the parameter. The parameter is, for example, the number of number plates NP recognized, an angle between the longitudinal direction of each number plate NP and the traveling direction of the vehicle 10, the arrangement direction of a plurality of the number plates NP, or the degree of distortion of each number plate NP with respect to a rectangle. The value corresponding to the parameter is more than 0 and equal to or less than 1. In S513, the LPP (NP) and the LDP (NP) are set such that LPP (NP)>LDP (NP) is satisfied. On the other hand, in S514, the LPP (NP) and the LDP (NP) are set such that LPP (NP)<LDP (NP) is satisfied.

If S511=NO or after the process in S513 or S514, the CPU executes a process in S521. In S521, the CPU determines whether any tire TY has been recognized. If any tire TY has been recognized (that is, S521=YES), the CPU advances the present process to S522, and executes a process in S523 or S524 in accordance with a determination result in S522. In contrast, if no tire TY has been recognized (that is, S521=NO), the CPU skips the processes in S522 to S524.

In S522, the CPU determines whether, in a case where the manner of parking is selected based on the current recognition result for the tire TY, the selection result is parallel parking. If the selection result is parallel parking (that is, S522=YES), the CPU advances the present process to S523. In contrast, if the selection result is perpendicular parking (that is, S522=NO), the CPU advances the present process to S524.

In S523 and S524, the CPU sets, based on the lookup table or the map, the likelihood of parallel parking LPP (TY) and the likelihood of perpendicular parking LDP (TY) based on the recognition result for the tire TY. The lookup table or map used in S523 and S524 define a correspondence relationship between at least one of the parameters corresponding to the recognition result for the tire TY and a value corresponding to the parameter. The parameter is, for example, the number of tires TY recognized, an angle between the arrangement direction of a plurality of tires TY and the traveling direction of the vehicle 10, an aspect ratio of an elliptic shape corresponding to the recognition result for each tire TY, or an angle between a long diameter of the elliptic corresponding to the recognition result for each tire TY and the traveling direction of the vehicle 10. The value corresponding to the parameter is more than 0 and equal to or less than 1. In S523, the LPP (TY) and the LDP (TY) are set such that LPP (TY)>LDP (TY) is satisfied. On the other hand, in S524, the LPP (TY) and the LDP (TY) are set such that LPP (TY)<LDP (TY) is satisfied.

If S521=NO or after the process in S523 or S524, the CPU executes a process in S531. In S531, the CPU determines whether any head light HL has been recognized. If any head light HL has been recognized (that is, S531=YES), the CPU advances the present process to S532, and executes a process in S533 or S534 in accordance with a determination result in S532. In contrast, if no head light HL has been recognized (that is, S531=NO), the CPU skips the processes in S532 to S534.

In S532, the CPU determines whether, in a case where the manner of parking is selected based on the current recognition result for the head light HL, the selection result is parallel parking. If the selection result is parallel parking (that is, S532=YES), the CPU advances the present process to S533. In contrast, if the selection result is perpendicular parking (that is, S532=NO), the CPU advances the present process to S534.

In S533 and S534, the CPU sets, based on the lookup table or the map, the likelihood of parallel parking LPP (HL) and the likelihood of perpendicular parking LDP (HL) based on the recognition result for the head light HL. The lookup table or map used in S533 and S534 defines a correspondence relationship between at least one of the parameters corresponding to the recognition result for the head light HL and a value corresponding to the parameter. The parameter is, for example, the number of head lights HL recognized or an angle between the arrangement direction of a plurality of head lights HL and the traveling direction of the vehicle 10. The value corresponding to the parameter is more than 0 and equal to or less than 1. In S533, the LPP (HL) and the LDP (HL) are set such that LPP (HL)>LDP (HL) is satisfied. On the other hand, in S534, the LPP (HL) and the LDP (HL) are set such that LPP (HL)<LDP (HL) is satisfied.

If S531=NO or after the process in S533 or S534, the CPU executes a process in S541. In S541, the CPU determines whether any car stop CS has been recognized. If any car stop CS has been recognized (that is, S541=YES), the CPU advances the present process to S542, and executes a process in S543 or S544 in accordance with a determination result in S542. In contrast, if no car stop CS has been recognized (that is, S541=NO), the CPU skips the processes in S542 to S544.

In S542, the CPU determines whether, in a case where the manner of parking is selected based on the current recognition result for the car stop CS, the selection result is parallel parking. If the selection result is parallel parking (that is, S542=YES), the CPU advances the present process to S543. In contrast, if the selection result is perpendicular parking (that is, S542=NO), the CPU advances the present process to S544.

In S543 and S544, the CPU sets, based on the lookup table or the map, the likelihood of parallel parking LPP (CS) and the likelihood of perpendicular parking LDP (CS) based on the recognition result for the car stop CS. The lookup table or map used in S543 and S544 define a correspondence relationship between at least one of the parameters corresponding to the recognition result for the car stop CS and a value corresponding to the parameter. The parameter is, for example, the number of car stops CS recognized, an angle between the arrangement direction of a plurality of car stops CS and the traveling direction of the vehicle 10, or a distance to each car stop CS from the vehicle 10. The value corresponding to the parameter is more than 0 and equal to or less than 1. In S543, the LPP (CS) and the LDP (CS) are set such that LPP (CS)>LDP (CS) is satisfied. On the other hand, in S544, the LPP (CS) and the LDP (CS) are set such that LPP (CS)<LDP (CS) is satisfied.

If S541=NO or after the process in S543 or S544, the CPU executes a process in S551. In S551, the CPU determines whether any detected obstacle DO, that is, a three-dimensional object other than the car stop CS, has been recognized. If any detected obstacle DO has been recognized (that is, S551=YES), the CPU advances the present process to S552, and executes a process in S553 or S554 in accordance with a determination result in S552. In contrast, if no three-dimensional object other than the car stop CS has been recognized as the detected obstacle DO (that is, S551=NO), the CPU skips the processes in S552 to S554.

In S552, the CPU determines whether, in a case where the manner of parking is selected based on the current recognition result for the detected obstacle DO, the selection result is parallel parking. If the selection result is parallel parking (that is, S552=YES), the CPU advances the present process to S553. In contrast, if the selection result is perpendicular parking (that is, S552=NO), the CPU advances the present process to S554.

In S553 and S544, the CPU sets, based on the lookup table or the map, the likelihood of parallel parking LPP (DO) and the likelihood of perpendicular parking LDP (DO) based on the recognition result for the detected obstacle DO. The lookup table or map used in S553 and S554 defines a correspondence relationship between at least one of the parameters corresponding to the recognition result for the detected obstacle DO and a value corresponding to the parameter. The parameter is, for example, the size and shape of a space around the detected obstacle DO or a distance from the vehicle 10 to the detected obstacle DO. The value corresponding to the parameter is more than 0 and equal to or less than 1. In S553, the LPP (DO) and the LDP (DO) are set such that LPP (DO)>LDP (DO) is satisfied. On the other hand, in S554, the LPP (DO) and the LDP (DO) are set such that LPP (DO)<LDP (DO) is satisfied.

If S551=NO or after the process in S553 or S554, the CPU executes a process in S561. In S561, the CPU determines whether any white line WL has been recognized. If any white line WL has been recognized (that is, S561=YES), the CPU advances the present process to S562, and executes a process in S563 or S564 in accordance with a determination result in S562. In contrast, if no white line WL has been recognized (that is, S561=NO), the CPU skips the processes in S562 to S564.

In S562, the CPU determines whether, in a case where the manner of parking is selected based on the current recognition result for the white line WL, the selection result is parallel parking. If the selection result is parallel parking (that is, S562=YES), the CPU advances the present process to S563. In contrast, if the selection result is perpendicular parking (that is, S562=NO), the CPU advances the present process to S564.

In S563 and S564, the CPU sets, based on the lookup table or the map, the likelihood of parallel parking LPP (WL) and the likelihood of perpendicular parking LDP (WL) based on the recognition result for the white line WL. The lookup table or map used in S563 and S564 defines a correspondence relationship between at least one of the parameters corresponding to the recognition result for the white line WL and a value corresponding to the parameter. The parameter is, for example, the number, contrast, direction, or length of white lines WL. The value corresponding to the parameter is more than 0 and equal to or less than 1. In S563, the LPP (WL) and the LDP (WL) are set such that LPP (WL)>LDP (WL) is satisfied. On the other hand, in S564, the LPP (WL) and the LDP (WL) are set such that LPP (WL)<LDP (WL) is satisfied.

If S561=NO or after the process in S563 or S564, the CPU executes a process in S570. In S570, the CPU calculates a final likelihood of parallel parking LPP based on the initial value LPP0 of the likelihood of parallel parking LPP, the likelihood of parallel parking LPP (NP) based on each recognition result, and the like. Furthermore, the CPU calculates a final likelihood of perpendicular parking LDP based on the initial value LDP0 of the likelihood of perpendicular parking LDP, the likelihood of perpendicular parking LDP (NP) based on each recognition result, and the like.

Specifically, in the present specific example, the final likelihood of parallel parking LPP is calculated as below.

$$LPP1 = \frac{LPP0 \cdot LPP(NP)}{LPP0 \cdot LPP(NP) + (1 - LPP0) \cdot (1 - LPP(NP))} \quad \text{[Equation 1]}$$

$$LPP2 = \frac{LPP1 \cdot LPP(TY)}{LPP1 \cdot LPP(TY) + (1 - LPP1) \cdot (1 - LPP(TY))} \quad \text{[Equation 2]}$$

$$LPP3 = \frac{LPP2 \cdot LPP(HL)}{LPP2 \cdot LPP(HL) + (1 - LPP2) \cdot (1 - LPP(HL))} \quad \text{[Equation 3]}$$

$$LPP4 = \frac{LPP3 \cdot LPP(CS)}{LPP3 \cdot LPP(CS) + (1 - LPP3) \cdot (1 - LPP(CS))} \quad \text{[Equation 4]}$$

$$LPP5 = \frac{LPP4 \cdot LPP(DO)}{LPP4 \cdot LPP(DO) + (1 - LPP4) \cdot (1 - LPP(DO))} \quad \text{[Equation 5]}$$

$$LPP6 = \frac{LPP5 \cdot LPP(WL)}{LPP5 \cdot LPP(WL) + (1 - LPP5) \cdot (1 - LPP(WL))} \quad \text{[Equation 6]}$$

The final likelihood of perpendicular parking LDP is also calculated as described above.

Then, in S575, the CPU compares the likelihood of parallel parking LPP with the likelihood of perpendicular parking LDP. If LPP>LDP (that is, S575=YES), the CPU determines the current selection result for the manner of parking to be parallel parking (S580). In contrast, if LPP<LDP (that is, S575=NO), the CPU determines the current selection result for the manner of parking to be perpendicular parking (that is, parking in a garage). See S585.

(Modified Examples)

The present disclosure is not limited to the above-described embodiments, and appropriate changes can be made to the embodiments. Typical modified examples will be described below. In the description below of the modified examples, only differences from the above-described embodiments will be described. Furthermore, in the above-described embodiments and the modified examples, the same or equivalent components are denoted by the same reference signs. Accordingly, for components with the same reference signs as those in the above-described embodiments, the descriptions in the embodiments are incorporated in the description below of the modified examples by reference unless the incorporation causes technical inconsistency or any particular additional description is provided.

The present disclosure is not limited to the specific apparatus configurations illustrated in the above-described embodiments. That is, for example, the vehicle 10 is not limited to a four-wheeled vehicle. Specifically, the vehicle 10 may be a three-wheeled vehicle or a six- or eight-wheeled vehicle such as a freight truck. Furthermore, the type of the vehicle 10 may be a vehicle equipped only with an internal combustion engine, an electric vehicle or a fuel-cell vehicle equipped with no internal combustion engine, or a hybrid vehicle. The number of door panels 17 is not particularly limited.

The arrangement and the number of ranging sensors 21 that are ultrasonic sensors are not limited to the arrangement and the number in the above-described specific examples. That is, for example, in a case where the third front sonar SF3 is disposed at a central position in the vehicle width direction, the fourth front sonar SF4 is omitted. Similarly, in a case where the third rear sonar SR3 is disposed at the central position in the vehicle width direction, the fourth rear sonar SR4 is omitted. The third side sonar SS3 and the fourth side sonar SS4 may be omitted.

The ranging sensor 21 is not limited to the ultrasonic sensor. That is, for example, the ranging sensor 21 may be a laser radar sensor or a millimeter-wave radar sensor.

The arrangement and the number of imaging units 22 are not limited to the arrangement and the number in the above-described examples. That is, for example, the left camera CL and the right camera CR may be disposed at positions different from the positions of the door mirrors 18. Alternatively, the left camera CL and the right camera CR may be omitted. The manner-of-parking selecting operation, included in the plurality of parking assisting operations that can be performed by the parking assisting apparatus 20, can be achieved using only the front camera CF or only the left camera CL and the right camera CR.

In the above-described embodiments, the control unit 26 is configured such that the CPU reads the program from the ROM or the like and activates the program. However, the present disclosure is not limited to such a configuration. That is, for example, the control unit 26 may be a digital circuit, for example, an ASIC such as a gate array, configured to be capable of preforming the operations described above. ASIC is an abbreviation of an APPLICATION SPECIFIC INTEGRATED CIRCUIT.

The present disclosure is not limited to the specific operations and manners of processing illustrated in the above-described embodiments. For example, recognition results may be stored in a storage medium other than the nonvolatile RAM (for example, a RAM and/or a magnetic storage medium).

The place where the parking space PS is provided is not limited to the parking lot PL. That is, for example, the parking space PS may be provided in, for example, a parking enabled zone on a road and a makeshift parking zone set in a park or the like.

The recognition targets and the recognition methods for objects and feature shapes are not limited to the recognition targets and the recognition methods in the above-described specific examples. For example, the car stop CS may be recognized as a feature shape in an image based on image information. It is possible to omit at least one of recognition of the white line WL, the car stop CS, the detected obstacle DO, the head light HL, the tire TY, and the number plate NP. Recognition of another feature shape may be used, the feature shape being different from the white line WL, the car stop CS, the detected obstacle DO, the head light HL, the tire TY, and the number plate NP.

In the above-described specific examples, candidates for the manner of parking are of two types: parallel parking and perpendicular parking. However, the present disclosure is not limited to such manners. That is, for example, perpendicular parking may be subdivided into "parking in a garage" as illustrated in FIG. 2 and "oblique parking" as illustrated in FIG. 6.

(i) in FIG. 6 illustrates a case where white lines WL and car stops CS are provided in a parking space PS in a parking lot PL for oblique parking. Furthermore, (ii) illustrates a case where detected obstacles DO including wall-shaped three-dimensional objects WA are present around a parking space PS in a parking lot PL for oblique parking. Moreover, (iii) illustrates a case where, in a parking lot PL for oblique parking, a feature shape, such as a number plate NP, of a parked vehicle PV around a parking space PS can be recognized.

A process in the present modified example may be favorably executed by partly modifying the routines in FIGS. 5A to 5C. Specifically, for example, in S500, the initial values LPP0 and LDP0 of the likelihood of parallel parking LPP and the likelihood of perpendicular parking LDP are each set to 0.33. Furthermore, if S512=NO, the CPU executes a process of determining "whether parking in a garage is to be performed". The CPU advances the present process to S514 in a case where parking in a garage is to be performed, and skips a process in S514 in a case where oblique parking is to be performed. Similar operation is performed in S522, S532, S542, S552, and S562.

The CPU subsequently determines whether one of LPP and LDP is more than 0.33 instead of executing the process in S575. If LPP>0.33, the CPU determines the current selection result for the manner of parking to be parallel parking. On the other hand, if LDP>0.33, the CPU determines the current selection result for the manner of parking to be parking in a garage. Furthermore, in a case where both LPP and LDP are equal to or less than 0.33, the CPU determines the current selection result for the manner of parking to be oblique parking.

The following is also not limited to the above-described specific examples: the method for calculating the final likelihood of parallel parking LPP and the final likelihood of perpendicular parking LDP, that is, the method for integrating the likelihood of parallel parking LPP (NP) and the like based on each recognition result.

The modified examples are also not limited to the ones illustrated above. Furthermore, the plurality of modified examples may be combined together. Moreover, all or some of the above-described embodiments may be combined with all or some of the modified examples.

A parking assisting apparatus according to an aspect of the present disclosure is configured to be mounted in a vehicle to assist in parking the vehicle in a parking space. The parking assisting apparatus includes:

an imaging unit provided to acquire image information corresponding to an image of surroundings of the vehicle;

an image processing section provided to recognize a feature shape in the image by processing the image information acquired by the imaging unit;

an obstacle detecting section provided to acquire positional-relationship information corresponding to a positional relationship between the vehicle and an obstacle present around the parking space, and a manner-of-parking selecting section provided to select a manner of parking the vehicle in the parking space from a plurality of manner candidates including perpendicular parking and parallel parking based on the feature shape recognized by the image processing section and the positional-relationship information acquired by the obstacle detecting section.

The manner-of-parking selecting section is configured to select the manner of parking from the plurality of manner candidates by integrating a likelihood of each of the manner candidates based on the positional-relationship information acquired by the obstacle detecting section with a likelihood of the manner candidate based on a recognition result for at least one of a white line, a tire of a parked vehicle, and a number plate of the parked vehicle, each of which is the feature shape, to calculate final likelihoods of the respective manner candidates, and by comparing the calculated final likelihoods of the respective manner candidates with each other.

Parenthesized reference numerals denoting means in claims indicate an example of a correspondence relationship between the means and specific means described in embodiments described below.

What is claimed is:

1. A parking assisting apparatus configured to be mounted in a vehicle to assist in parking the vehicle in a parking space, the parking assisting apparatus comprising:
    an imaging unit provided to acquire image information corresponding to an image of surroundings of the vehicle;
    an image processing section provided to recognize a feature shape in the image by processing the image information acquired by the imaging unit;
    an obstacle detecting section provided to acquire positional-relationship information corresponding to a positional relationship between the vehicle and an obstacle present around the parking space, and
    a manner-of-parking selecting section provided to select a manner of parking the vehicle in the parking space from a plurality of manner candidates including perpendicular parking and parallel parking based on the feature shape recognized by the image processing section and the positional-relationship information acquired by the obstacle detecting section, wherein
    the manner-of-parking selecting section is configured to select the manner of parking from the plurality of manner candidates by integrating a likelihood of each of the manner candidates based on the positional-relationship information acquired by the obstacle detecting section with a likelihood of the manner candidate based on a recognition result for at least one of a white line, a tire of a parked vehicle, and a number plate of the parked vehicle, each of which is the feature shape, to calculate final likelihoods of the respective manner candidates, and by comparing the calculated final likelihoods of the respective manner candidates with each other.

2. The parking assisting apparatus according to claim 1, further comprising a ranging sensor provided to transmit a search wave externally from the vehicle and to receive a received wave including a reflected wave of the search wave from the obstacle and having intensity corresponding to a distance between the vehicle and the obstacle, wherein
    the obstacle detecting section is provided to acquire the positional-relationship information based on a reception result for the received wave by the ranging sensor.

3. A control unit for a parking assisting apparatus configured to be mounted in a vehicle to assist in parking the vehicle in a parking space, the control unit comprising:

an image processing section provided to recognize a feature shape in the image by processing image information acquired by an imaging unit provided to acquire image information corresponding to an image of surroundings of the vehicle;

an obstacle detecting section provided to acquire positional-relationship information corresponding to a positional relationship between the vehicle and an obstacle present around the parking space, and a manner-of-parking selecting section provided to select a manner of parking the vehicle in the parking space from a plurality of manner candidates including perpendicular parking and parallel parking based on the feature shape recognized by the image processing section and the positional-relationship information acquired by the obstacle detecting section, wherein the manner-of-parking selecting section is configured to select the manner of parking from the plurality of manner candidates by integrating a likelihood of each of the manner candidates based on the positional-relationship information acquired by the obstacle detecting section with a likelihood of the manner candidate based on a recognition result for at least one of a white line, a tire of a parked vehicle, and a number plate of the parked vehicle, each of which is the feature shape, to calculate final likelihoods of the respective manner candidates, and by comparing the calculated final likelihoods of the respective manner candidates with each other.

4. The control unit according to claim 3, wherein the obstacle detecting section is provided to acquire the positional-relationship information based on a reception result for a received wave by a ranging sensor provided to transmit a search wave externally from the vehicle and to receive the received wave including a reflected wave of the search wave from the obstacle and having intensity corresponding to a distance between the vehicle and the obstacle.

\* \* \* \* \*